United States Patent [19]

Ohtani

[11] 4,359,875
[45] Nov. 23, 1982

[54] AUTOMOTIVE AIR CONDITIONING APPARATUS

[75] Inventor: Masami Ohtani, Konan, Japan

[73] Assignee: Diesel Kiki Company, Ltd., Tokyo, Japan

[21] Appl. No.: 256,228

[22] Filed: Apr. 21, 1981

[30] Foreign Application Priority Data

Apr. 22, 1980 [JP] Japan ................................ 55-53987

[51] Int. Cl.³ .......................... B60H 3/04; F25B 27/00
[52] U.S. Cl. ...................................... 62/133; 62/323.4
[58] Field of Search ............................... 62/133, 323.4

[56] References Cited

U.S. PATENT DOCUMENTS

| | | | |
|---|---|---|---|
| 3,462,964 | 8/1969 | Haroldson | 62/133 |
| 3,918,543 | 11/1975 | Halem | 62/323.4 X |
| 4,226,090 | 10/1980 | Horian | 62/133 |
| 4,269,033 | 5/1981 | Birch | 62/133 |

Primary Examiner—William E. Wayner
Attorney, Agent, or Firm—Jordan and Hamburg

[57] ABSTRACT

In on-off controlling a compressor of an automotive air conditioning apparatus in a cooling mode of operation, a compressor control switch responsive to a parameter indicative of an operating condition of the compressor is actuated by an output of a sensor for sensing an engine operating condition of a motor vehicle. During a deceleration, the sensor establishes an electrica path from a power source to the compressor which bypasses the compressor control switch. This bypass path is also set up when the motor vehicle is in a standstill with the engine idled. As a deceleration lasts over a given period of time, a timer is actuated to make a connection between the compressor control switch and the power source alive again. An idling up circuit compensates for a decrease in the engine speed attributable to compressor activation during a constant speed run and/or a standstill of the motor vehicle.

10 Claims, 6 Drawing Figures

Fig. 3a
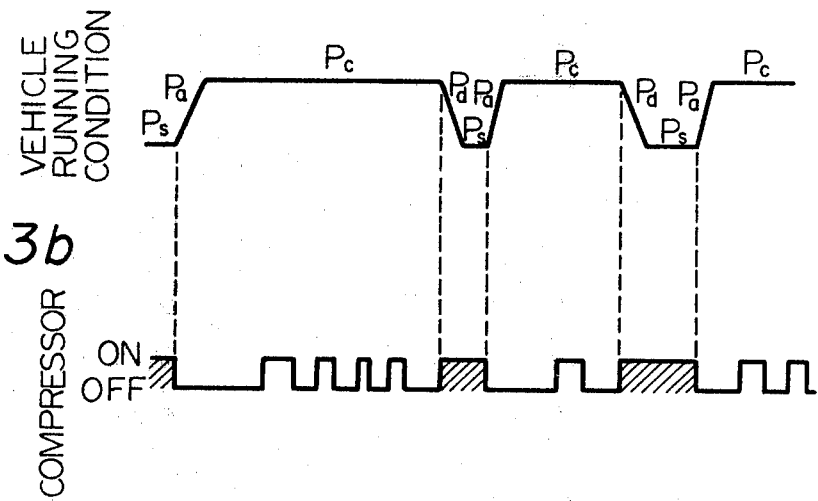
Fig. 3b
Fig. 4
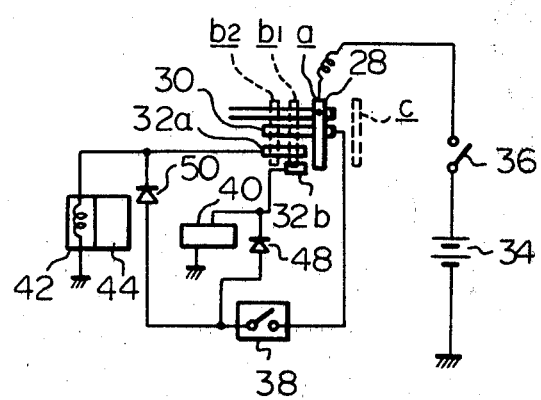

AUTOMOTIVE AIR CONDITIONING APPARATUS

BACKGROUND OF THE INVENTION

The present invention relates to an air conditioning apparatus for a motor vehicle and, more particularly, to a system for controlling an operation of a compressor included in the apparatus in accordance with engine operating conditions of a motor vehicle.

A prior art automotive air conditioning apparatus is so constructed as to on-off control its compressor within a given range which prevents a cooler operated by the compressor from being cooled off beyond a freezing level. For this purpose, the air conditioning apparatus employs a compressor control switch of the type which is actuated when the temperature at the cooler or in an air flow duct downstream of the cooler drops to a predetermined level or when the pressure of a refrigerant circulated through the cooler drops. However, such a compressor on-off control is carried out with no regard to engine operating conditions or running speeds of a motor vehicle in which the apparatus is installed. When a motor vehicle runs in an urban area, it is repeatedly accelerated, decelerated and stopped as indicated in FIG. 1a in which $P_s$ shows a stop period, $P_a$ an acceleration period, $P_c$ a constant speed cruising period and $P_d$ a deceleration period. Since the compressor is controlled with its relation with the engine operating conditions or vehicle running conditions left out of consideration, it is often activated during accelerations $P_a$ or deactivated during decelerations $P_d$. This degrades the general energy efficiency, forces the engine to bear excessive loads and deteriorates fuel economy of the engine.

SUMMARY OF THE INVENTION

An automotive air conditioning apparatus embodying the present invention includes an air flow duct, a compressor for driving a cooler to cool air in the duct, compressor control means for on-off controlling the compressor in dependence on a predetermined parameter which indicates an operating condition of the cooler, engine operation sensor means for sensing vaying operating condition of an engine of the motor vehicle, and control interruption means for preventing the compressor control means from controlling the compressor under at least one predetermined engine operating condition of the motor vehicle.

In accordance with the present invention, in on-off controlling a compressor of an automotive air conditioning apparatus in a cooling mode of operation, a compressor control switch responsive to a parameter indicative of an operating condition of the compressor is actuated by an output of a sensor for sensing an engine operating condition of a motor vehicle. During a deceleration, the sensor sets up an electric path from a power source to the compressor which bypasses the compressor control switch. This bypass path is also set up when the motor vehicle is in a standstill with the engine idled. As a deceleration lasts over a given period of time, a timer is actuated to make a connection between the compressor control switch and the poser source alive again. An idling up circuit compensates for a decrease in the engine speed attributable to compressor activation during a constant speed run and/or a standstill of the motor vehicle.

It is an object of the present invention to minimize an additional load on an engine of a motor vehicle attributable to activation of a compressor.

It is another object of the present invention to promote smooth acceleration of a motor vehicle.

It is another object of the present invention to make an effective use of energy for driving a compressor.

It is another object of the present invention to cut down an operation rate of a compressor.

It is another object of the present invention to enhance fuel economy of a motor vehicle.

It is another object of the present invention to make up for a decrease in the engine speed resulting from activation of a compressor.

It is another object of the present inventron to provide a generally improved air conditioning apparatus for a motor vehicle.

Other objects, together with the foregoing, are attained in the embodiments described in the following description and illustrated in the accompanying drawings.

BRIEF DESCRIPTION OF THE DRAWINGS

FIGS. 3a and 3b indicate a characteristic relationship between vehicle running conditions and operations of an air conditioning apparatus according to the present invention; and FIG. 4 is a circuit diagram showing another embodiment of the present invention.

DESCRIPTION OF THE PREFERRED EMBODIMENTS

While the air conditioning apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1A:
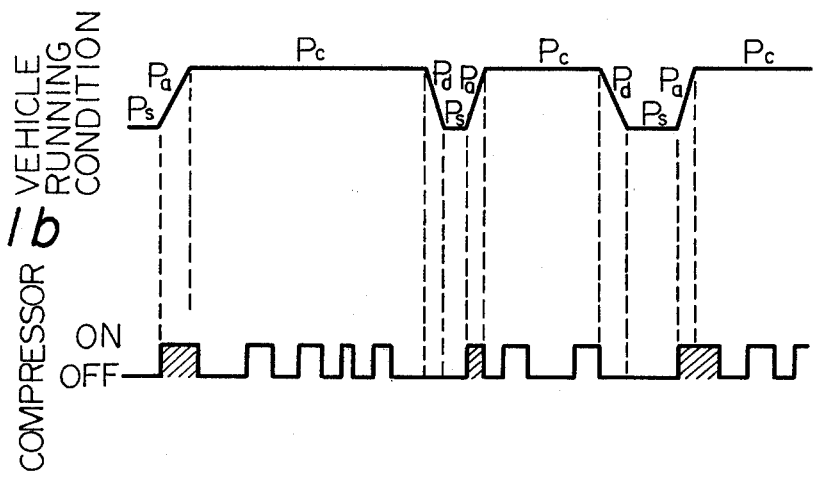
FIGS. 1a and 1b are diagram demonstrating a relationship between vehicle running conditions and operations of a prior art air conditioning apparatus.
Figure 1B:
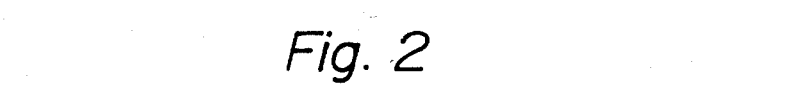
Figure 2:
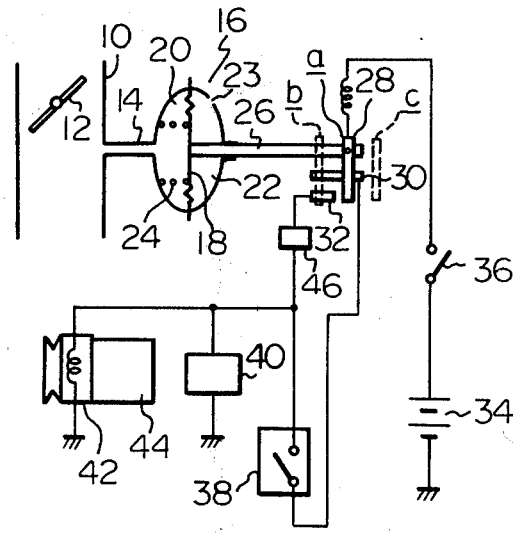
FIG. 2 is a circuit diagram of an air conditioning apparatus embodying the present invention.

Refereing to FIG. 2, the reference numeral 10 designates an intake passageway which is communicated with cylinders of an internal combustion engine through an intake manifold in a manner well known to the art. A throttle valve 12 in the form of a butterfly valve is positioned in the intake passageway 10 and pivotable on a shaft to controllably vary the air-fuel ratio of a combustible mixture fed to the engine cylinders through the intake passageway 10. A narrow vacuum induction channel 14 extends from the intake passageway 10 downstream of the throttle valve 12 to a pressure sensing assembly 16. This pressure sensing assembly 16 has a housing which rigidly supports a flexible diaphragm member 18 such that its interior is bisected into a vacuum chamber 10 and an atmospheric chamber 22 by the diaphragm member 18. The vacuum induction channel 14 provides communication between the intake passageway 10 and vacuum chamber 20. The atmospheric chamber 22 is formed with a small aperture 23 open to the surrounding atmosphere. A spring 24 is accommodated in the vacuum chamber 20 to contstantly bias the diaphragm member 18 toward the atmospheric chamber 22. The force of the spring 24 is so selected that, when a motor vehicle cruises at a constant speed, the spring force is held in equilibrium with a magnitude of vacuum then communicated from the intake passageway 10 to the vacuum chamber 20 for thereby maintaining the diaphragm member 18 in a non-deflected or neutral position as shown in FIG. 2. An actuator rod 26 is rigidly connected at one end to the diaphragm member 18 and projected at the other end from the atmospheric chamber 22 away from the vacuum induction channel 20. The actuator rod 26 carries at its free end a movable contact member 28 which extends out perpendicular or substantially perpendicular to the actuator rod 26. When the diaphragm member 18 is urged in either direction based on a relationship between the force of the spring 24 and the magnitude of vacuum in the vacuum chamber 20, the actuator rod 26 will move intergrally with the diaphragm member 18 to in turn move the movable contact member 28 between positions b and c; the other position a will be reached when the diaphragm member 18 is in its neutral position. Parallel stationary contact members 30 and 32 are fixed in place by suitable means in perpendicular or substantially perpendicular relation to the movable contact member 28 to be selectively engaged by the latter. As shown, one end of the stationary contact member 30 is positioned closer to the movable contact member 28 than the corresponding end of the stationary contact 32.

A power source 34 is connected with the movable contact member 10 via a switch 36 adapted to be closed for operating the air conditioner in a cooling mode. Connected with the stationary contact member 32 is a compressor control switch 38 which connects at its other terminal to a series connection of an idling up circuit 40 and an electromagnetic clutch 42 adapted to drive a compressor 44. The compressor 44 is operatively associated with a cooler which is located in an air flow duct of the air conditioner, though not shown in the drawing. The stationary contact member 32 is also connected with the idling up circuit 40 via the intermediary of a timer 46. The compressor control switch 38 is operned and closed for an on-off control of the compressor 44 as will be described in detail. A typical example of the compressor control switch 38 may be a temperature sensitive switch designed to sense a temperature at the cooler driven by the compressor 44 and closes itselt upon drop of the cooler temperature down to its freezing level. Another example may be a pressure sensitive switch which senses a pressure of a refrigerant circulated in a refrigeration system of the apparatus and closes itself upon drop of the regrigerant pressure to a predetermined lower limit.

The idling up circuit 40 when energized functions to selectively increase the idiling speed of the engine by slightly increasing its opening of the throttle valve as will be described in detail. For example, the idling up circuit 40 may comprise a mechanism having an electromagnetic valve for the adjustment of an air pressure and arranged to control an acceleration system of the vehicle by an air pressure supplied from the electromagnetic vale.

Referring also to FIGS. 3a and 3b, operations of the air conditioning apparatus thus constructed will be described. For convenience purpose, the motor vehicle is supported to repeat stops $P_s$, accelerations $P_a$ and constant speed cruisings $P_c$ as indicated in FIGS. 3a.

When the motor vehicle cruises at a constant speed for an interval $P_c$ with the switch 36 closed for activating the air conditioner in a cooler mode, a constant level of vacuum (for instance, −150 mmHG to −400 mmmHG) is communicated from the intake passageway 10 to the vacuum chamber 20 of the pressure sensor 16. This vacuum is counteracted by but equilibrated with the force of the spring 24 such that the diaphragm 18 remains unstressed in the neutral position shown in FIG. 2. The movabl contact 28 on the actuator rod 26 is located at the position a where it engages the stationary contact 30 but not the stationary contact 32. Under this ocndition, output power of the source 34 is coupled to the idling up circuit 40 and electromagnetic clutch 42 via the switch 36 and compressor control switch 38. The compressor control switch 38 being of the type described on-off controls the clutch 42 for thereby clutching and unclutching the compressor 44. The compressor control switch 38 energizes the idling up circuit 40 very time it energizes the clutch 42, thereby increasing the idling speed of the engine. As will be seen, such an increase in the engine idling speed automatically makes up for a decrease in the engine revolution speed caused by the activation of the compressor.

When the motor vehicle is decelerated over a period $P_d$ from a constant speed period $P_c$, the throttle valve 12 moves to reduce the effective cross-sectional area of the intake passageway 10. Then the vacuum in the narrow passageway 14 is intensified to a level (for example, more than −480 mmHG) where its overcomes the force of the spring 24 and deflects the diaphragm 18 toward the passageway 14. The actuator rod 26 is moved integrally with the diaphragm from the position a to the position b where the movable contact 28 is brought into engagement with the stationary contact 32 in addition to the stationary contact 30. This time, the power from the source 34 bypasses the compressor control switch 38 and directly flows through the timer 46 to the idling up circuit 40 and clutch 42. The clutch 42 keeps the compressor 44 turned on throughout the deceleration period $P_d$ because the source power is supplied directly thereto regardless of actions of the switch 38; the idling up circuit 40 holds the engine idling speed at the elevated level. It sometimes happens, however, that the motor vehicle is decelerated continuously over a long period of time as during a downhill drive, subjecting the compressor to severe conditions. This problem is settled by the provision of the timer 46. When a deceleration of the motor vehicle lasts over a timer period preset in the timer 46, the timer 46 is opened to disconnect the power supply path between the stationary contact 32 and clutch 42 so that the compressor is deactivated and thus prevented from being freezed to an unusual point. The timer 46 will be closed again after such a long time of continuous deceleration.

When the motor vehicle is accelerated over a period $P_a$, the throttle valve 12 moves to increase the effective cross-sectional area of the intake passageway 10 to reduce the intensity of the vacuum in the passageway 10 downstream thereof. This weakened vacuum admitted in the vacuum chamber 20 via the passageway 14 is overcome by the bias of the spring 24. Because this vacuum level (for example, less than −150 mmHG) is lower than a vacuum level (i.e., −150 mmHG to −480 mmHG) during a constant speed run which is lower than a vacuum level (i.e., −480 mmHG) during a deceleration, the diaphragm 18 is urged toward the atmospheric chamber 22 by the spring 24. Then the actuator rod 26 is moved to shift the movable contact to the farthest position c where the contact 28 becomes disengaged from both of the stationary contacts 30 and 32.

Accordingly, the power supply path from the power source 34 to the idling up circuit 40 and clutch 42 is completely cut off. It will be noted that, in the event of a gear shift for acceleration, the diaphragm 18 can be prevented from positional hunting if the aperture 23 in the housing of the pressure sensor 16 is sufficiently small.

The principles of the air conditioning apparatus discussed hereinabove will be understood to consist in deactivating the compressor during accelerations of the motor vehicle, activating it during decelerations, and turning it on and off during constant speed runs in dependence on a preselected parameter such as cooler temperature or refrigerant pressure. The engine can therefore be safeguarded against overloads which are detrimental to smooth accelerations. Activation of the compressor during decelerations promotes an effective use of energy and thereby improves fuel economy of the engine while serving to exert an additional braking effort. During decelerations, the compressor remains operative for a sufficiently long time until the timer 46 interrupts the power supply to the clutch 42, regardless of the surface temperature of the cooler or the pressure of the regrigerant. With the resulting marked cooling effect, the ratio of compressor on periods to compressor off periods can be minimized when the motor vehicle enters a constant speed cruising range. This reduces the operation rate of the compressor and thereby saves energy consumed by the compressor. Furthermore, the idling up circuit 40 operates in timed relation with the compressor 44 to make up for decreases in the engine revolution speed which would result from activation of the compressor 44.

Another embodiment of the air conditioning apparatus according to the present invention is illustrated in FIG. 4. In FIG. 4, parts and elements similar to those shown in FIG. 2 are denoted by the same reference numerals and characters.

The apparatus of FIG. 4 is provided with a modified stationary electrode which is made up of a first contact $32_a$ and a second contact $32_b$ shorter than the first contact $32_a$. The contacts $32_a$ and $32_b$ are positioned such that their ends to be engaged by the movable contact 28 first are aligned together. The movable contact 28 has a first position a engaged with the stationary contacts 30, a second position b1 engaged with the contact 30, $32_a$ and $32_b$, a third position b2 engaged with the stationary contacts 30 and $32_a$, and a fourth position c engaged with none of the stationary electrodes; these positions will be reached by the movable contact 28 in accordance with the magnitude of vacuum in the intake passageway 10 through the elements 14 to 26 described in connection with the first embodiment. More specifically, an arrangement is so made that the movable contact 28 moves to the position a when the motor vehicle cruises at a constant speed, positions b1 when the motor vehicle is in a standstill with the engine idled, position b2 upon deceleration of the motor vehicle, and position c upon acceleration of the same. The movable contact 30 connects to the compressor control switch 38, the movable contact $32_a$ to the electromagnetic clutch 42 for driving the compressor 44, and the movable contact $32_b$ to the idling up circuit 40. The compressor control switch 38 is connected through a diode 48 to the idling up circuit 40 and through a diode 50 to the electromagnetic clutch 42.

When the motor vehicle cruises at a constant speed in a period $P_c$, the movable contact 28 is brought to the position a where the power source 34 is connected to the idling up circuit 40 and clutch 42 via the switches 36 and 38. The compressor control switch 38 then controls the clutch 42 on on-off bases for thereby clutching and unclutching the compressor 44. The compressor control switch 38 energizes the idling up circuit 40 every time it energized the clutch 42, thereby increasing the idling speed of the engine. Such an increase in the idling speed automatically makes up for a decrease in the engine revolution speed caused by the activation of the compressor as discussed in conjunction with the first embodiment.

As the motor vehicle is brought to a standstill $P_s$ with the engine idled, the movable contact 28 slides to the position b1 into engagement with the stationary contacts $32_a$ and $32_b$ in addition to the contact 30. Under this condition, the clutch 42 is energized to keep the compressor 44 operative while the idling up circuit 40 is also energized to increase the idling speed.

Upon deceleration of the motor vehicle over a period $P_d$, the movable contact 28 moves to the position b2 where it engages the stationary contacts 30 and $32_a$ but not the contact $32_b$. The power supply path to the idling up circuit 40 is cut off in this way. Consequently, the idling speed of the engine is not increased though the clutch 42 is coupled to drive the compressor 44. This type of circuit arrangement will prevent the engine idling speed from being increased during decelerations and thus avoids counteractions to decelerations.

Upon acceleration of the motor vehicle over a period $P_a$, the movable contact 28 is shifted to the farthest position clear of all of the stationary contacts 30, $32_a$ abd $32_b$ to the idling up circuit 40 and clutch 42 is completely cut off.

In summary, it will be seen that the present invention provides an improved air conditioning apparatus which includes a conventional switch for on-off controlling a compressor in accordance with a parameter related with an operating condition of a cooler, sensor means for sensing at least decelerations of a motor vehicle to bypass the compressor control switch during decelerations. With this apparatus, there can be employed wasteful energy during decelerations for the purpose of driving the compressor which saves fuel consumption and drive power of an engine. The apparatus deactivates the compressor during accelerations to reduce a load on the engine while an idling up circuit included in the apparatus prevents a decrease in the engine speed attributable to activation of the compressor. The idling up circuit can be so designed as to become operative in a standstill of the motor vehicle but not during deceleation, facilitating efficient deceleration operations.

Various modifications will become possible for those skilled in the art after receiving the teachings of the present disclosure without departing from the scope thereof. For example, the parameter indicative of operating conditions of a compressor and to which the control switch 38 is responsive is not limited to the temperature at a cooler or the pressure of the refrigerant but may be the passage of air cooled by the cooler. Furthermore, while the control switch 38 has been shown and described as being bypassed during decelerations by the stationary contacts 30 and 32, it may take the form of a normally closed switch which opens during decelerations.

What is claimed is:

1. An air conditioning apparatus for a motor vehicle comprising:

an air flow duct;

a compressor for driving a cooler to cool air in the duct;

compressor control means for on-off controlling the compressor in dependence on a predetermined parameter which indicates an operating condition of the cooler;

engine operation sensor means for sensing varying operating condition of an engine of the motor vehicle; and control interruption means for preventing the compressor control means from controlling the compressor under at least one predetermined engine operating condition of the motor vehicle;

said compressor control means comprising a switch means which is caused by the control interruption means to be bypassed by an electric power supply path to the compressor.

2. An air conditioning apparatus as claimed in claim 1, in which the engine operation sensor means senses a magnitude of vacuum developed in an air-fuel mixture intake passageway downstream of a throttle valve.

3. An air conditioning apparatus as claimed in claim 1, in which said at least one predetermined engine operating condition comprises a prolonged deceleration of the motor vehicle.

4. An air conditioning apparatus as claimed in claim 1, in which the at least one predetermined engine operation condition comprises an idling of the motor vehicle.

5. An air conditioning apparatus as claimed in claim 1, further comprising idiling speed increasing means to increase an idling speed of the engine under the at least one predetermined engine operating condition.

6. An air conditioning apparatus as claimed in claim 5, in which the idling speed increasing means increases an idling speed of the engine during a temporary stop of the motor vehicle.

7. An air conditioning apparatus as claimed in claim 1, in which the engine operation sensor means includes a flexible diaphragm member and a spring constantly biasing the diaphragm member in one direction.

8. An air conditioning apparatus as claimed in claim 1, in which the control interruption means comprises switch means operatively connected to the engine operating sensor means to be driven in accordance with the sensed engine operating conditions.

9. An air conditioning apparatus for a motor vehicle comprising:

an air flow duct;

a compressor for driving a cooler to cool air in the duct;

compressor control means for on-off controlling the compressor in dependence on a predetermined parameter which indicates an operating condition of the cooler;

engine operation sensor means for sensing varying operating condition of an engine of the motor vehicle; and control interruption means for preventing the compressor control means from controlling the compressor under at least one predetermined engine operating condition of the motor vehicle;

the control interruption means comprising switch means operatively connected to the engine operating sensor means to be driven in accordance with the sensed engine operating condition;

the switch means comprising a movable contact operatively connected to the engine operation sensor means, a first stationary contact electrically connected to the compressor through the compressor control means, the first stationary contact being connected to the movable contact under a constant speed cruising of the motor vehicle, and a second stationary contact directly connected to the compressor, the second stationary contact being connected to the movable contact under a deceleration and idling of the motor vehicle.

10. An air conditioning apparatus as claimed in claim 9, in which the switch means further ocmprises a third stationary contact which is connected to the movable contact under idling of the motor vehicle.

* * * * *